UNITED STATES PATENT OFFICE.

HERMANN BREMER, OF MUNICH, GERMANY.

PROCESS OF DISSOLVING ALBUMEN.

SPECIFICATION forming part of Letters Patent No. 650,003, dated May 22, 1900.

Application filed December 15, 1897. Serial No. 662,020. (No specimens.)

*To all whom it may concern:*

Be it known that I, HERMANN BREMER, a citizen of the German Empire, residing at Munich, in the Kingdom of Bavaria, Germany, have invented certain new and useful Improvements in Processes of Treating Organized Albuminous Substances; and I do hereby declare the following to be a full, clear, and exact description of the invention, such as will enable others skilled in the art to which it appertains to make and use the same.

The present invention relates to the manufacture of albumen, and more particularly the isolation of organized albumens.

It has hitherto been impossible to completely dissolve out and thereby lead to the isolation of the albuminous substances existing in animal and plant cells (also known as "organized" albumens) in a commercially and industrially available manner without an attendant considerable alteration and destruction of the natural albuminous compounds. Weak acids and weak non-volatile alkalies dissolve only slight and commercially insignificant quantities of such albuminous substances, while concentrated alkalies and acids dissolve them indeed, but only with serious alterations. It is hence impossible under the old methods to isolate any commercially useful quantities of the unchanged natural albumen or organized albumen by methods hitherto pursued. It has hitherto been impossible to dissolve completely in weak alkalies any albuminoid with the exception of casein. Casein, however, is not an organized albuminous substance. It cannot be classed with the latter substances, for while they are inert with respect to alkalies it is a strong dibasic acid, which in consequence of its strong acid properties enters readily into combination with alkalies, including earth-alkalies, forming with them salts which are soluble to some extent at least in water. This is not the case with the organized albumens of the animal and plant cells, which consist of albumen, globulin, proteid, and albuminoids, and which are neutral compounds. While, therefore, it is possible to unite casein in a wet or, indeed, also in a dry condition with bases to form more or less soluble salts, this is not possible under hitherto known conditions with the organized albuminous substances, such as flesh, plant nuclei, and glutens.

It is the object of the present invention to make organized albuminous substances soluble in water, and with this object in view my invention consists in treating such substances with ammonia solutions under pressure and at a high heat and in such other steps, features, and methods as will be set forth hereinafter and pointed out in the claims.

I will now more fully particularize my invention by describing in detail what I consider the best method of carrying the same into effect.

I treat the organized albuminous substance which it is desired to render soluble—such as meat, ground or comminuted or in other forms, cacao, cereals and other plant products rich in albumens—with ammonia, either by introducing it into a weak solution of ammonia or of a compound that will readily give off ammonia, such as a readily-decomposed salt of or combination of ammonium, and subject the mixture to a high temperature and pressure. I find that very good results are obtained at a pressure of about three atmospheres and a temperature of 135° centigrade, or thereabout. The ammonia or other ammonia-yielding substance may for this purpose be dissolved in water or watery vapor or also in a mixture of water and alcohol or similar liquids. Whatever the composition of such mixture or liquor may be, it must in all cases have the property of dissolving the albuminous substances resulting from the above treatment, at least when subjected to slight heat. The albumen solutions obtained by this treatment are immediately evaporated to dryness or to the consistency of an extract by subjecting them to a low temperature, a temperature which must be below that at which the albuminous compounds will coagulate. This is preferably done *in vacuo*. The surplus ammonia is driven off in this manner. In carrying out this step of the process it is often desirable to add at once a sufficient quantity of alkali, such as caustic alkalies or alkali-carbonates—for example, chalk—to form the corresponding alkali-albumen compounds or albuminates. By this addition all of the ammonia is driven off and the albuminate of the desired alkali metal is obtained. This last addition is useful and desirable, for example, where it is desired to open up cacao.

Instead of evaporating the albumen solutions another method of separating the albuminous substances consists in salting them out, in precipitating them with alcohol, or in supersaturating the solution with acids. The albuminous compounds thus precipitated may when freshly obtained be employed directly as easily-digestible albumen preparations, or they may be treated again with alkaline solvent, such as ammonia or fixed alkalies, or with dilute acids at a temperature below 100° centigrade, whereby they are converted into the corresponding soluble compounds. The solutions thus formed are then evaporated *in vacuo*, as above. Only so much of the alkalies or dilute acid, such as hydrochloric acid, is employed for this purpose as just sufficient to obtain a complete solution. This can readily be determined by preliminary trials.

The present invention is adapted not only for the treatment of pure albuminous substances, but in general for substances and products containing albuminous bodies. For substances or products which contain, in addition to the albuminous substances, other non-albuminous matter it is not necessary to separate the latter. Such is the case, for example, with cacao.

What I claim, and desire to secure by Letters Patent of the United States, is—

1. The process of rendering organized albuminous compounds soluble which consists in treating substances containing such albuminous compounds with ammonia under pressure and at a high temperature and then evaporating the resultant albumen solution at a temperature below the coagulating-point of the dissolved albuminous substances and *in vacuo* and adding alkali to form the corresponding albuminates.

2. The process of rendering organized albuminous compounds soluble which consists in treating substances containing such albuminous compounds with ammonia under pressure and at a high temperature and then separating the dissolved albuminous substances from the solution thus formed, and then treating the resultant substances with a solvent, at a temperature below 100°, centigrade, and finally evaporating *in vacuo* at a temperature at which coagulation does not take place.

3. The process of rendering organized albuminous compounds soluble which consists in treating substances containing such albuminous compounds with ammonia under pressure and at a high temperature, and then separating the dissolved albuminous substances from the solution thus formed, then treating the resulting substance with an alkaline solvent at a temperature below 100°, centigrade, and finally evaporating *in vacuo* at a temperature in which the coagulation does not take place.

In testimony whereof I affix my signature in presence of two witnesses.

HERMANN BREMER.

Witnesses:
HANS BERTHHELT,
EMIL HENZEL.